Dec. 14, 1965     W. GEBHARDT ETAL     3,223,276
DOOR SEAL FOR HOUSEHOLD APPLIANCES
Filed July 30, 1962                              4 Sheets-Sheet 1

United States Patent Office 3,223,276
Patented Dec. 14, 1965

3,223,276
DOOR SEAL FOR HOUSEHOLD APPLIANCES
Wilhelm Gebhardt, Munich, and Heinrich Gibbels, Chieming, Germany, assignors to Siemens-Electrogeräte Aktiengesellschaft, Berlin, Germany, a corporation of Germany
Filed July 30, 1962, Ser. No. 213,360
Claims priority, application Germany, Aug. 18, 1961, S 75,347
9 Claims. (Cl. 220—46)

Our invention relates to a lid or other door structure for household appliances such as dishwashing machines, laundering machines, refrigerators or freezers.

Such appliances require a tight seal in the gap between the door and the door frame to prevent the escape of vapors or liquid from dishwashers and laundering machines, or the ingress of heat into refrigerators and freezers. It is known for this purpose to provide an elastically deformable, hollow gasket member and a device for deforming the gasket member when the door is closed. The gasket-deforming devices heretofore known are purely mechanical. For example, they comprise a bar mounted in the hollow of the gasket or along its external wall and rotatable during closing of the door to thereby deform the gasket member thus squeezing it into the gap between door and frame or between the two wings of a double door, as the case may be. These known door constructions with mechanical sealing devices are relatively expensive to manufacture and often fail to secure a uniform sealing action, particularly when the doors are rather large. Furthermore, the mechanical parts of the sealing device tend to have an unsatisfactorily short time of useful life on account of excessive wear.

It is an object of our invention, therefore, to devise a door construction for household appliances with an elastically deformable, hollow gasket member between the door structure and the appertaining frame structure which, when the door is closed, secures a uniform sealing action along the perimeter of the door regardless of its size, while avoiding the costly and space-consuming construction and other disadvantages of the above-mentioned mechanisms.

To this end, and in accordance with a feature of our invention, we provide the door structure with an elastically deformable, generally tubular gasket member and connect the fluid-filled interior of this member with a pressure control device which, when the door is closed, changes the pressure of the fluid medium contained in the hollow gasket member and thereby also the volume of the member in the sense required to produce a tight seal. The fluid medium thus contained in the gasket and subject to variation in pressure may consist of air or other gas, or a liquid may be used for this purpose. A combined hydraulic and pneumatic sealing device of this kind may also be employed.

According to another feature of our invention, it is particularly advantageous to provide the door, for example, of a refrigerator cabinet, with a control device which reduces the volume of the internal gasket space during opening and closing of the door by producing a negative pressure in that space. That is, in closed position as well as in open position of the door, an optimal sealing action is secured due to the atmospheric pressure or the elastic force of the gasket body, whereas during opening and closing motion of the door the sealing cross section of the gasket member is reduced by the negative pressure then being produced within the gasket member. As a result, the amount of friction to be overcome when moving the door between closed and open positions is essentially diminished and a premature or excessive wear by friction is likewise minimized. The negative pressure in the hollow space of the gasket member can be produced for example by means of a small diaphragm-type pump coupled with the actuating handle of the door. When the door is equipped with a latching device, the handle of the latching device is preferably coupled with such a diaphragm pump or another device suitable for producing the negative pressure in the interior of the gasket member.

According to another, alternative feature of our invention, the appliance is provided with a pressure-control device which, when the door is closed, subjects the internal space of the gasket member to super-atmospheric pressure and thereby increases the gasket volume. This type of pressure control is particularly advantageous for dishwashers and laundering machines, especially those equipped with a built-in water pump, in which a particularly good sealing at the door is required when the pump is in operation or when water is otherwise being supplied under pressure. With such a door, the gasket member is normally effective to produce no appreciable sealing action or only the slight sealing effect required for low-pressure operation, so that when the door is being opened and closed the amount of friction at the gasket member and the resulting amount of wear are correspondingly slight. However, at the moment when the pump is switched on or water is otherwise supplied under high pressure, the door being then closed, the gasket member is subjected to pressure in its interior in order to increase its cross section to secure optimum sealing action.

According to still another feature of our invention, a particularly simple pressure-control device for the gasket member, applicable to the door of dishwashers and similar washing machines, is obtained simply by a pressure connection between the hollow space in the gasket member and the pump for the rinsing-water circulation or other supply of water under pressure.

The above-described pressure-controlled gasket member according to the invention may be mounted on the hinged portion of the door proper or it may be mounted on the frame structure. The same applies to the pressure-control device communicating with the interior of the gasket member.

The above-mentioned and further objects, advantages and features of our invention, said features being set forth with particularity in the claims annexed hereto, will be apparent from and will be described in, the following with reference to the embodiments of door structures according to the invention illustrated by way of example on the accompanying drawings in which:

Figure 1:
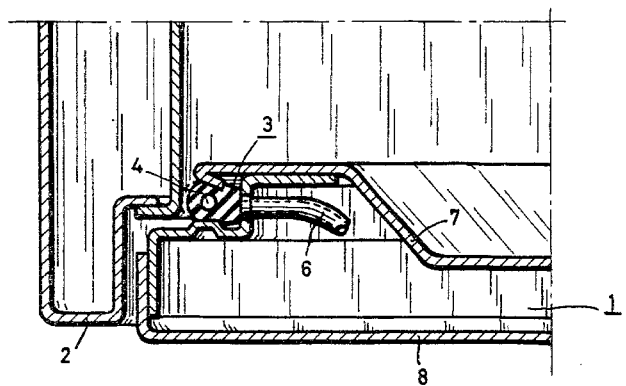
FIG. 1 shows schematically and in section a corner portion of a door structure with a sealing device located in the gap between door and frame, the sealing gasket member being not yet in fully expanded condition.
Figure 2:
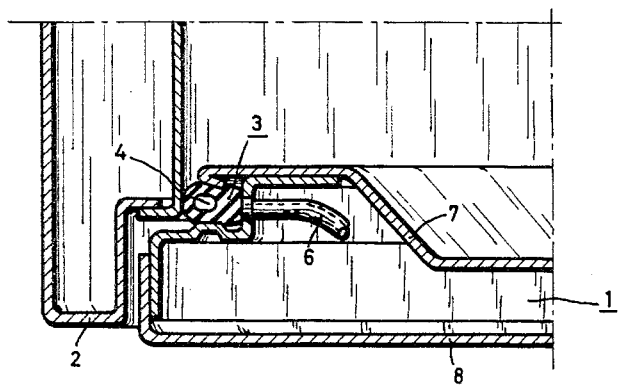
FIG. 2 shows the same view as FIG. 1 but illustrates the gasket member in fully active sealing condition.
Figure 3:
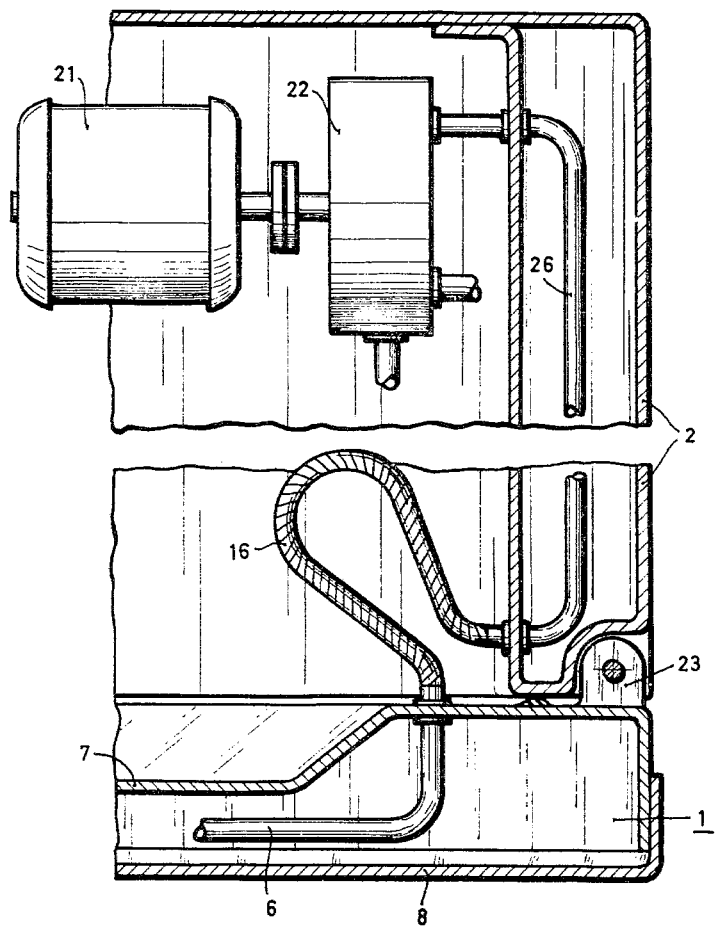
FIG. 3 is a sectional view of part of the same appliance and shows the hollow space of the gasket member connected to a pump operating as a pressure-control device.

In FIGS. 1 to 3, the lid or door structure 1, for example of a dishwasher, is composed of an inner portion 7 and an outer portion 8, both consisting of sheet metal. The door is hinged at 23 to the housing of the dishwasher whose front portion 2 forms the frame structure with an opening to be closed by the door 1. The gap between the door structure 1 and the frame structure 2 is closed by a sealing gasket member 3 which extends along the perimeter of the door in a groove formed between the inner portion 7 and the outer portion 8 of the door structure. The body of the gasket member 3 consists of elastic material such as rubber or a synthetic elastomer and is provided with at least one longitudinal hollow space 4 which is connected by a pressure pipe 6 with a pump 22 driven by an electric motor 21. In dishwashers that comprise a pump for circulation of rinsing water, the latter pump is preferably identical with the one denoted in FIG. 3 by 22. The pressure line 6 extends within the door 1 to the vicinity of the hinge 23, preferably near the upper or lower edge of the door. A flexible hose 16 or a rotatable hose coupling connects the line 6 through a pipe 26 with the pump 22.

During operation of the pump the hollow space 4 in the gakset member 3 is subjected to pressure. The gasket member then expands from the condition shown in FIG. 1 to the sealing condition shown in FIG. 2, thus securing the desired tight seal during the period of time in which a high-pressure seal is required. When the pump is at standstill, the pressure is reduced and the gasket member contracts so that the door can be opened and closed without difficulty and without causing appreciable frictional wear at the gasket member.

Figure 5:
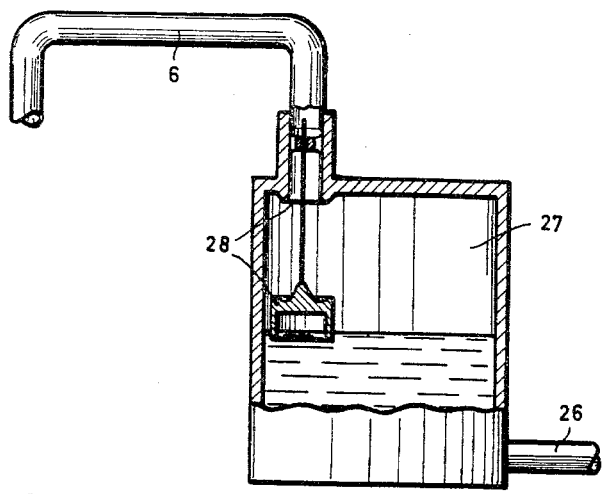
FIG. 5 shows partly in section another pressure-control device.
Figure 6:
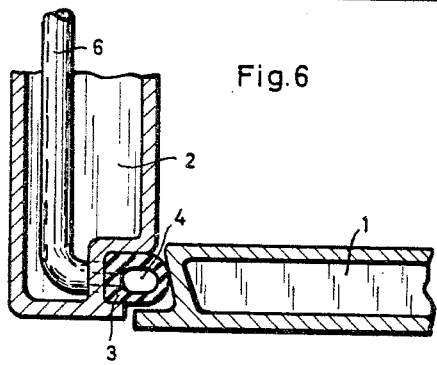
FIG. 6 is a sectional view of part of a door construction whose hollow gasket member is controllable by a device as shown in FIG. 5.

The supply of pressure medium to the hollow space 4 of the gasket member 3 can be simplified considerably by mounting the gasket member not on the door 1 but, as shown in FIG. 6, on the frame structure 2 to which the door is hinged. In the latter case, no movable supply lines are required for the medium that produces the positive or negative pressure in the interior of the gasket member 3. In order to prevent the gasket member 3 from being filled by the liquid itself, an air container 27 according to FIG. 5 is preferably provided between the pressure line 6 leading to the hollow space 4 of the gasket member and the pressure line 26 coming from the pump 22 or other pressure-control device. The supply of water or other liquid increases the pressure above the water level in the container 27, and this increased pressure is propagated through the pressure line 6 to the interior 4 of the gasket member 3. A float valve 28 at the outlet of the air container 27 prevents the liquid from penetrating into the air pressure line 6 and into the gasket member 3 in the event of any leakage developing in the gasket member.

Figure 4:
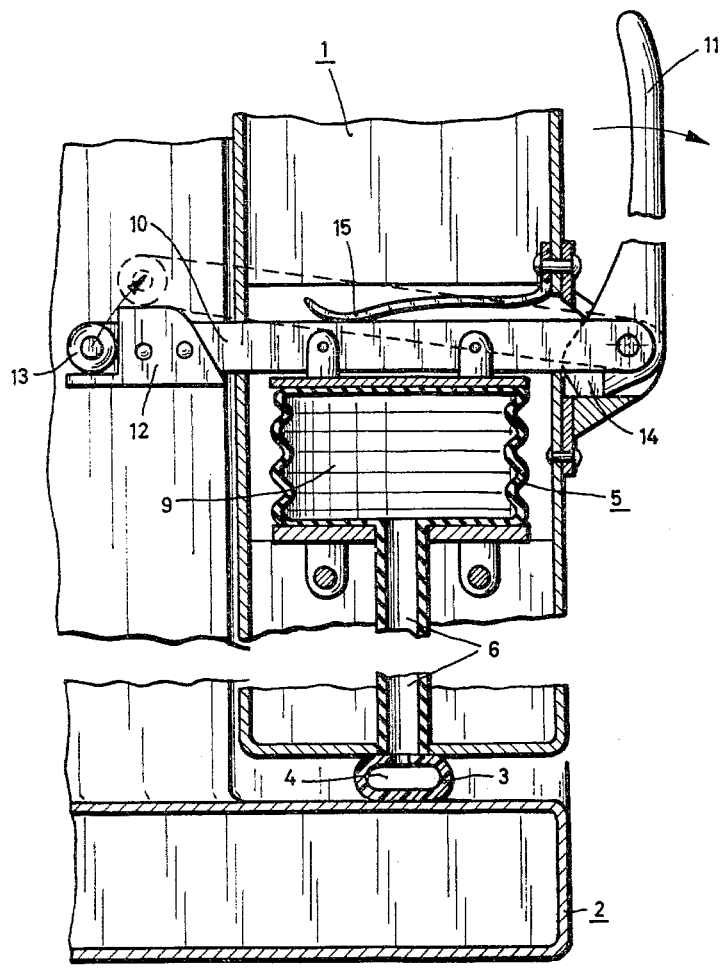
FIG. 4 shows in section another door portion of an appliance with a pressure-control device actuated by the handle of the door.

In the embodiment illustrated in FIG. 4, the sealing gasket 3 consists of a tubular body of elastic material whose internal cross section is such as to secure optimum sealing action at normal pressure. In order to reduce friction between the gasket member 3 and the frame structure 2, or between the gasket member 3 and the door 1 if the gasket member is mounted on the frame structure 2, there is provided a device 5 for producing negative pressure during opening and closing of the door. The pressure-control device comprises a variable-volume pump 9 of the diaphragm or bellows type which is connected by a line 6 with the hollow space 4 of the gasket member 3. When the pump 9 is being actuated, it causes the gasket member to collapse under the external pressure. Actuation of the pump 9 is effected by means of a handle 11 which is designed as door handle and, if desired, may be connected with the latching device (not shown) of the door. The handle 11 has a dog 14 abutting against a linking bridge 10 whic his connected with the pump 9. When the handle 11 is being pulled, it turns clockwise about its pivot pin as indicated by the arrow. This causes the dog 14 to lift the bridge 10 to the broken-line position. As a result the volume enclosed in the pump 9 is expanded, thus producing the desired negative pressure. Since normally the handle 11 is not actuated in the above-described manner when the door is being closed, a cam 12 is firmly secured to the door-frame structure, and the bridge 10 carries a guide roller 12 which, during closing of the door, rolls over the contour of cam 12 whereby again the bridge is lifted to the broken-line position and produces the desired negative pressure in the diaphragm pump. A spring 15 serves to always return the bridge 10 to the starting position and thus re-establishes the original pressure in pump 9.

Pressure-controlled gasket seals according to the invention can readily be given such a design that they will firmly clamp the door in closed position, particularly by having the expanding hollow gasket member engage into a groove or recess. Consequently, such doors need not necessarily be provided with the conventional latch or lock means for holding them reliably in closed position.

Upon studying this disclosure it will be obvious to those skilled in the art that our invention affords various modifications and can be given embodiments other than particularly illustrated and described herein, without departing from the essential features of the invention and within the scope of the claims annexed hereto.

We claim:

1. Door for household appliances operating with a fluid pressure system, said door comprising a door-frame structure forming a door opening, a door structure hinged to said frame structure for covering said opening, a hollow gasket member mounted on one of said structures around said openings and disposed between said two structures, a fluid medium in said hollow gasket member, and pressure control means for operating the fluid pressure system of the household appliance, said pressure control means communicating with the interior of said gasket member for simultaneously changing the volume of said gasket member by changing the pressure of said medium to thereby seal said opening when the door is closed.

2. Door for household appliances comprising a door-frame structure forming a door opening, a door structure hinged to said frame structure for covering said opening, a hollow gasket member mounted on one of said structures around said openings and disposed between said two structures, said gasket member having normally a volume adapted to seal said opening when the door is closed, a fluid medium in said hollow gasket member, and pressure control means communicating with the interior of said gasket member and comprising a source of negative pressure for reducing the volume of said gasket member by reducing the pressure of said medium.

3. In a door according to claim 2, said negative-pressure source comprising a variable-volume pump connected with the interior of said gasket member and forming together therewith a self-contained pressure system, and mechanism means connected to said pump and responsive to opening and closing of said door structure for actuating said pump.

4. In a door according to claim 3, said mechanism means comprising a pull handle pivotally mounted on said door structure for opening said door structure, said handle being connected to said pump for actuating it by pivotal motion of said handle.

5. Door for household appliances operating with a fluid pressure system, said door comprising a door-frame structure forming a door opening, a door structure hinged to said frame structure for covering said opening, a hollow gasket member mounted on one of said structures around said openings and disposed between said two structures, said gasket member having normally a volume smaller than required for maximum sealing action, a fluid medium in said hollow gasket member, and pressure control means communicating with the interior of said gasket member and comprising a source of positive pressure for operating the fluid pressure system of the appliance and simultaneously for increasing the volume of said gasket member by increasing the pressure of said medium.

6. In a door according to claim 5 said positive-pressure source comprising water-pressure supply means connected with the interior of said gasket member for increasing the volume of said member when said supply means is active.

7. In a door according to claim 5, said positive-pressure source comprising a water pump.

8. In a door according to claim 5, said positive-pressure source comprising water-pressure means and a sealed air vessel interposed between said water pressure means and said hollow gasket means for supplying said gasket means with air pressure dependent upon the water pressure.

9. In a door according to claim 1, engagement means on the other of said structures cooperating with said gasket member when the volume of said gasket member is increased for positively holding the door structure in closed position.

References Cited by the Examiner
UNITED STATES PATENTS

| | | | |
|---|---|---|---|
| 2,301,963 | 11/1942 | Marple et al. | 220—46 |
| 2,527,084 | 10/1950 | Smith | 220—46 |

THERON E. CONDON, *Primary Examiner.*

EARLE J. DRUMMOND, *Examiner.*